(12) United States Patent
Zhang et al.

(10) Patent No.: US 7,685,814 B2
(45) Date of Patent: Mar. 30, 2010

(54) SYSTEMS, APPARATUSES, AND METHODS OF DETERMINING PLUGGING OR DEPLUGGING OF A DIESEL OXIDATION CATALYST DEVICE

(75) Inventors: Yuetao Zhang, Columbus, IN (US); Daniel D. Wilhelm, Nashville, IN (US); Brian P. Liimatta, Columbus, IN (US)

(73) Assignee: Cummins Filtration, Inc., Nashville, TN (US)

( * ) Notice: Subject to any disclaimer, the term of this patent is extended or adjusted under 35 U.S.C. 154(b) by 590 days.

(21) Appl. No.: 11/485,238

(22) Filed: Jul. 12, 2006

(65) Prior Publication Data

US 2008/0010975 A1 Jan. 17, 2008

(51) Int. Cl.
*F01N 3/00* (2006.01)
(52) U.S. Cl. .............................. 60/295; 60/274; 60/276; 60/277; 60/297; 60/311
(58) Field of Classification Search .................. 60/274, 60/276, 295, 297, 311, 277
See application file for complete search history.

(56) References Cited

U.S. PATENT DOCUMENTS

| | | | |
|---|---|---|---|
| 4,503,672 A | 3/1985 | Stark et al. | |
| 4,510,749 A | 4/1985 | Taguchi et al. | |
| 4,520,624 A | 6/1985 | Kiyota et al. | |
| 4,549,399 A | 10/1985 | Usui et al. | |
| 4,576,617 A | 3/1986 | Renevot | |
| 5,106,755 A | 4/1992 | Tanaka | |
| 5,171,341 A | 12/1992 | Merry | |
| 5,725,618 A | 3/1998 | Shimoda et al. | |
| 5,987,882 A | 11/1999 | Voss et al. | |
| 6,006,516 A | 12/1999 | Voss et al. | |
| 6,256,984 B1 | 7/2001 | Voss et al. | |
| 6,422,008 B2 | 7/2002 | Voss et al. | |
| 6,763,659 B2 * | 7/2004 | Watanabe et al. | 60/297 |
| 6,817,174 B1 | 11/2004 | Igarashi et al. | |
| 6,820,414 B2 | 11/2004 | Stroia et al. | |
| 6,901,748 B2 | 6/2005 | Gomulka | |
| 6,938,409 B2 | 9/2005 | Birckigt et al. | |
| 6,955,042 B1 | 10/2005 | Wnuck et al. | |
| 6,966,179 B2 * | 11/2005 | Onodera et al. | 60/295 |
| 7,313,913 B2 * | 1/2008 | Okugawa et al. | 60/295 |
| 2001/0049936 A1 | 12/2001 | Voss et al. | |
| 2003/0108465 A1 | 6/2003 | Voss et al. | |
| 2003/0126789 A1 | 7/2003 | Valentine et al. | |
| 2004/0006976 A1 | 1/2004 | Stroia et al. | |
| 2004/0045281 A1 | 3/2004 | Ahrens et al. | |
| 2004/0079631 A1 | 4/2004 | Birckigt et al. | |
| 2004/0093859 A1 | 5/2004 | Schmeichel et al. | |

(Continued)

FOREIGN PATENT DOCUMENTS

EP   1374978 A1   1/2004

(Continued)

*Primary Examiner*—Thomas E Denion
*Assistant Examiner*—Diem Tran
(74) *Attorney, Agent, or Firm*—J. Bruce Schelkopf; Krieg DeVault LLP; L. Scott Paynter (57) ABSTRACT

One embodiment of the present invention includes a unique technique to regulate operation of an internal combustion engine. Other embodiments include unique apparatus, devices, systems, and methods relating to internal combustion engine including exhaust aftertreatment components, apparatus, and systems.

20 Claims, 4 Drawing Sheets

U.S. PATENT DOCUMENTS

| | | |
|---|---|---|
| 2004/0139734 A1 | 7/2004 | Schmeichel et al. |
| 2004/0187477 A1 | 9/2004 | Okugawa et al. |
| 2004/0194450 A1* | 10/2004 | Tanaka et al. ............... 60/285 |
| 2004/0226285 A1 | 11/2004 | Gomulka |
| 2004/0226288 A1 | 11/2004 | Okugawa et al. |
| 2004/0237509 A1 | 12/2004 | Bhargava et al. |
| 2005/0160724 A1 | 7/2005 | Valentine et al. |
| 2005/0232829 A1 | 10/2005 | Fuls |
| 2005/0257518 A1 | 11/2005 | Fayard |
| 2005/0274107 A1 | 12/2005 | Liu et al. |
| 2005/0279156 A1 | 12/2005 | He et al. |
| 2006/0010843 A1 | 1/2006 | Hammer |
| 2006/0035780 A1 | 2/2006 | Xu et al. |

FOREIGN PATENT DOCUMENTS

| | | |
|---|---|---|
| EP | 1600202 A1 | 11/2005 |
| EP | 1632654 A1 | 3/2006 |
| EP | 1645325 A2 | 4/2006 |
| WO | WO 9740266 A2 | 10/1997 |
| WO | WO 9740266 A3 | 10/1997 |
| WO | WO 0185876 A1 | 11/2001 |
| WO | WO 2004011783 A2 | 2/2004 |
| WO | WO 2004011783 A3 | 2/2004 |
| WO | WO 2004079167 A1 | 9/2004 |
| WO | WO 2004104385 A1 | 12/2004 |
| WO | WO 2004104389 A1 | 12/2004 |
| WO | WO 2005077495 A1 | 8/2005 |
| WO | WO 2005113114 A1 | 12/2005 |
| WO | WO 2006007362 A1 | 1/2006 |
| WO | WO 2006017056 A1 | 2/2006 |
| WO | WO 2006020647 A1 | 2/2006 |

* cited by examiner

SYSTEMS, APPARATUSES, AND METHODS OF DETERMINING PLUGGING OR DEPLUGGING OF A DIESEL OXIDATION CATALYST DEVICE

BACKGROUND

The present application relates generally to systems apparatuses and methods of determining, identifying, predicting, calculating, and/or correcting for plugging or de-plugging of diesel oxidation catalyst devices, and also relates generally to determining, identifying, predicting, calculating, and/or correcting for plugging rates or de-plugging rates of exhaust aftertreatment catalyst devices.

Diesel engines are widely used for transportation, generating electrical power, shipping, and other commercial or industrial applications. Recently there has been increasing need for cleaner diesel technologies that reduce harmful emissions found in diesel exhaust. It is desirable to reduce or eliminate a variety of diesel engine emissions including, Nitrogen oxides (NOx), sulfur oxides (SOx), carbon monoxide (CO), hydrocarbons, particulates including but not limited to soot, soluble organics, and others. A variety of technical solutions have been proposed for cleaner operation of diesel engines. One such solution is regenerative filtering, including active and passive forms of regenerative filters such as plasma filters, SCR filters, and others.

One problem encountered with aftertreatment filtration is clogging or plugging—in particular for diesel oxidation catalyst ("DOC") devices. Such plugging, including states preceding or leading to substantial or partial plugging or blockage, can cause high engine back pressure, low DOC conversion efficiency, degradation in catalytic performance, and/or insufficient inlet temperature to a soot filter for active filter regeneration. High engine back pressure from increased DOC restriction can result in loss of engine power, high EGR flow rates, high turbine outlet temperature, lower exhaust gas mass flow rate, and/or lower oxygen concentration. Degradation of DOC performance due to face plugging can also result in the reduction of DOC hydrocarbon oxidation efficiency, which can directly affect soot regeneration. Furthermore, DOC face plugging can potentially cause temperature gradient and non-uniformity inside soot filters, posing a potential risk of failure. These problems and others may possibly compromise system performance and risk damage. Thus, there continues to be a need for further contributions in this area of technology.

SUMMARY

One embodiment of the present invention includes a unique technique to regulate operation of an internal combustion engine. Other embodiments include unique apparatus, devices, systems, and methods relating to internal combustion engine aftertreatment. Further embodiments, forms, objects, features, advantages, aspects, and benefits of the present application shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the inventive scope is thereby intended. Any such alterations and further modifications in the illustrated embodiments, and any further applications of the principles of the roof are contemplated as would normally occur to one skilled in the art to which the invention relates.

Figure 1:
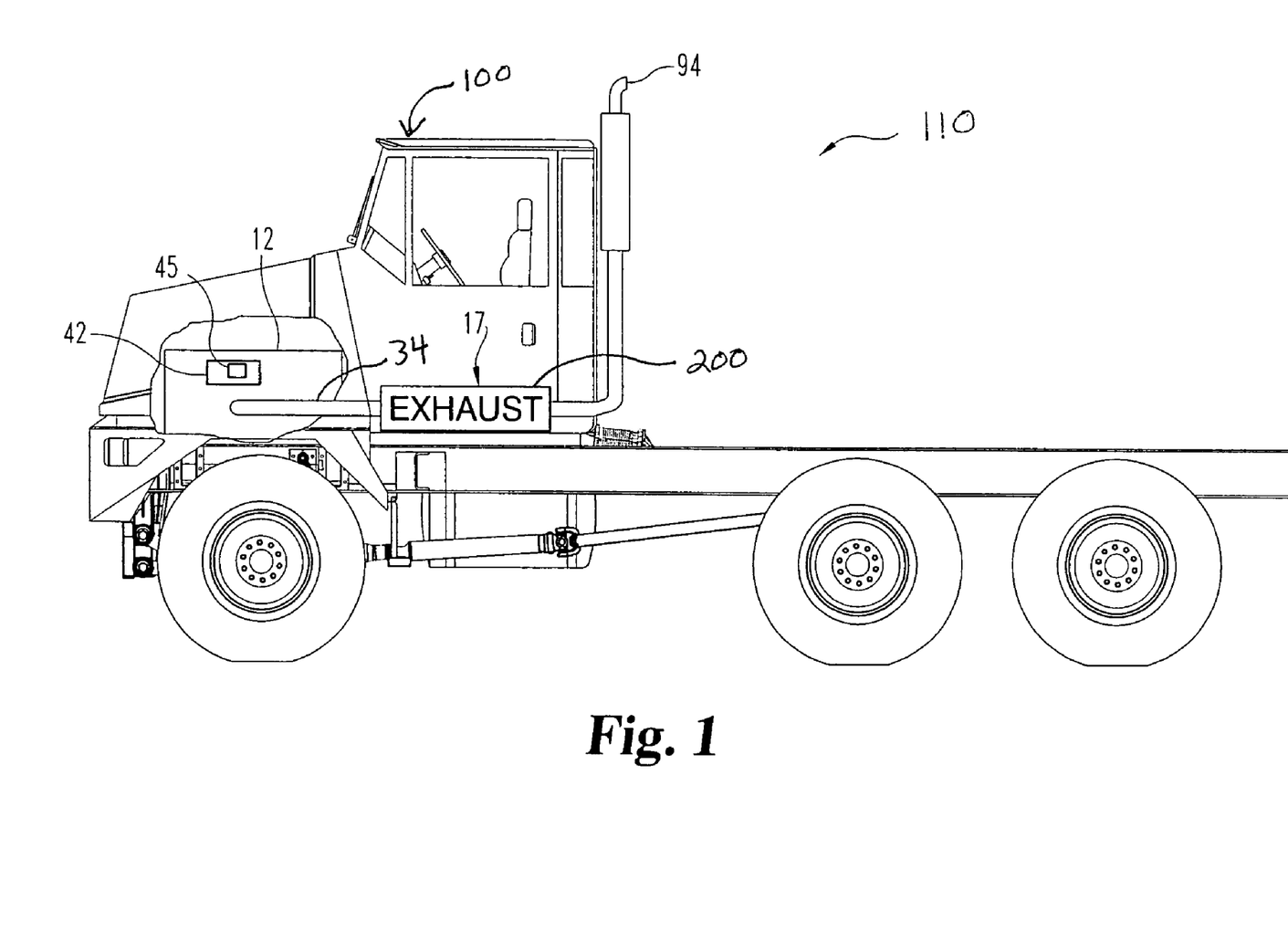
FIG. 1 is a partial diagrammatic view of a vehicle with an internal combustion engine system.

With reference to FIG. 1 there is shown a vehicle 100 which is a semitractor, but could alternatively be a variety of other vehicles such as light, medium, or heavy duty trucks, buses, cars, SUVs, or different land traveling vehicles. In other embodiments, the vehicle may be of a marine type. Vehicle 100 includes an internal combustion engine system 110 which includes an engine 12. System 110 further includes controller 42. Engine 12 is of a reciprocating piston type that is configured for compression ignition and direct or port-injected diesel fueling. However, in other embodiments, engine 12 may be of a different type and/or utilize a difference fuel type, or variety of different fueling that may or may not include diesel fuel. Exhaust from engine 12 travels through conduit 34 to exhaust management subsystem 200 and then, after being treated is released through tail pipe 94. Exhaust management subsystem 200 includes aftertreatment equipment 17.

Figure 2:
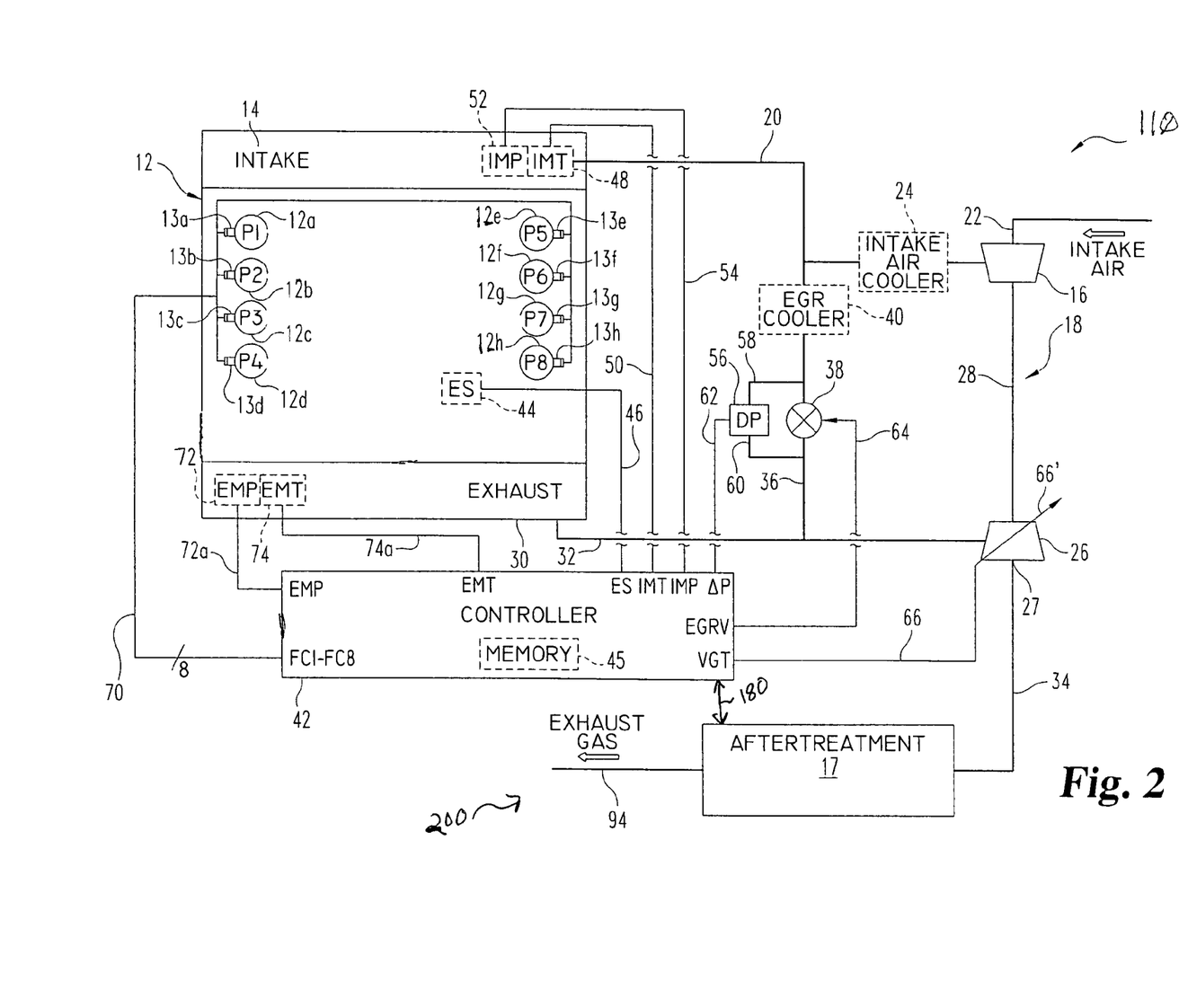
FIG. 2 is a diagrammatic view depicting the internal combustion engine system of FIG. 1 in greater detail.

Referring additionally to FIG. 2, engine 12 includes an intake manifold 14 fluidly coupled to an outlet of a compressor 16 of a turbocharger 18 via an intake conduit 20; where like reference numerals refer to like features. Compressor 16 includes a compressor inlet coupled to an intake conduit 22 for receiving fresh air therefrom. Optionally, as shown in phantom in FIG. 2, system 10 may include an intake air cooler 24 of known construction disposed in-line with intake conduit 20 between compressor 16 and intake manifold 14. The turbocharger compressor 16 is mechanically coupled to a turbocharger turbine 26 via a drive shaft 28. Turbine 26 includes a turbine inlet fluidly coupled to an exhaust manifold 30 of engine 12 via an exhaust conduit 32. Collectively, conduit 20, intake manifold 14, engine 12, exhaust manifold 30, and conduit 32 define a pathway 33 along which gas flows from compressor 16 to turbine 26 during nominal operation of engine 12.

Engine 12 includes eight pistons P1-P8 that are disposed in cylinders 12a-12h, respectively. Pistons P1-P8 are each connected to a crankshaft by a corresponding connecting rod (not shown) to reciprocally move within the respective cylinder 12a-12h in a standard manner for four stroke engine operation. Each cylinder 12a-12h includes a combustion chamber with appropriate intake and exhaust valves (not shown) and fuel injectors 13a-13h, respectively. Fuel injectors 13a-13h are of a standard type that operate in response to signals from electronic controls described in greater detail hereinafter.

An EGR valve 38 is disposed in-line with an EGR conduit 36 fluidly coupled at one end to intake conduit 20 and at an opposite end to exhaust conduit 32. An EGR cooler 40 of known construction may optionally be disposed in-line with EGR conduit 36 between EGR valve 38 and intake conduit 20 as shown in phantom in FIG. 1.

Controller 42 is generally operable to control and manage operational aspects of engine 12. Controller 42 includes memory 45 as well as a number of inputs and outputs for interfacing with various sensors and subsystems coupled to engine 12. Controller 42 can be an electronic circuit comprised of one or more components, including digital circuitry, analog circuitry, or both. Controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or such different arrangement as would occur to those skilled in the art. Controller 42 can include signal conditioners, signal format converters (such as analog-to-digital and digital-to-analog converters), limiters, clamps, filters, and the like as needed to perform various control and regulation operations described herein.

Controller 42 may be a standard type sometimes referred to as an electronic or engine control module (ECM), electronic or engine control unit (ECU) or the like, that is directed to the regulation and control of overall engine operation. Alternatively, controller 42 may be dedicated to control of just the operations described herein or to a subset of controlled aspects of engine 12. In any case, controller 42 preferably includes one or more control algorithms defined by operating logic in the form of software instructions, hardware instructions, dedicated hardware, or the like. These algorithms will be described in greater detail hereinafter, with respect to the operation of various aspects of system 110.

Controller 42 includes a number of inputs for receiving signals from various sensors or sensing systems associated with system 110. For example, system 110 includes an engine speed sensor 44 electrically connected to an engine speed input, ES, of controller 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equiangularly spaced teeth formed on a gear or tone wheel. Alternatively, engine speed sensor 44 may be any other known sensor operable as just described including, but not limited to, a variable reluctance sensor or the like.

System 110 further includes an intake manifold temperature sensor 48 disposed in fluid communication with the intake manifold 14 of engine 12, and electrically connected to an intake manifold temperature input (IMT) of controller 42 via signal path 50. Intake manifold temperature sensor 48 may be of known construction, and is operable to produce a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 110 further includes an intake manifold pressure sensor 52 disposed in fluid communication with intake manifold 14 and electrically connected to an intake manifold pressure input (IMP) of controller 42 via signal path 54. Alternatively, pressure sensor 52 may be disposed in fluid communication with intake conduit 20. In any case, pressure sensor 52 may be of known construction, and is operable to produce a pressure signal on signal path 54 indicative of air pressure within intake conduit 20 and intake manifold 14.

System 110 also includes an exhaust manifold pressure sensor 72 disposed in fluid communication with exhaust manifold 30 and electrically connected to an exhaust manifold pressure input (EMP) of controller 42 via signal path 72a. Alternatively, pressure sensor 72 may be disposed in the fluid communication with exhaust conduit 32. In any case, pressure sensor 72 may be of known construction and is operable to produce pressure signal on signal path 72a indicative of gas pressure within exhaust conduit 32 and exhaust manifold 30.

System 110 further includes a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of controller 42 via signal path 62. DP sensor 62 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent.

Controller 42 also includes a number of outputs for controlling one or more engine functions associated with system 110. For example, EGR valve 38 is electrically connected to an EGR valve output (EGRV) of controller 42 via signal path 64. Controller 42 is operable, as is known in the art, to produce an EGR valve control signal on signal path 64 to correspondingly control the position of EGR valve 38 relative to a reference position in a known manner. Controller 42 is accordingly operable to control EGR valve 38 to selectively provide a flow of recirculated exhaust gas from exhaust manifold 30 to intake manifold 14.

Controller 42 also includes at least one output, VGT, for controlling operation of a variable geometry turbine (VGT) mechanism 66' that is included in turbocharger 18. VGT mechanism 66' is schematically illustrated in FIG. 1 and is operatively connected to the VGT output via signal path 66. Controller 42 is operable to produce a variable geometry turbocharger control signal on signal path 66 to control the swallowing capacity (i.e., exhaust gas flow capacity) of turbine 26 by controlling the flow geometry of turbine 26 in a standard manner.

Another control mechanism that optionally may be included within system 110 is an electronically controllable wastegate valve (not shown) having a wastegate valve actuator (not shown) electrically connected to controller 42. The wastegate valve has an inlet fluidly coupled to exhaust conduit 32, and an outlet fluidly coupled to exhaust conduit 34. Controller 42 is operable to produce a wastegate valve control signal to control the position of the wastegate valve relative to a reference position. The position of the wastegate valve defines a cross-sectional flow area therethrough, and by controlling the cross-sectional flow area of the wastegate valve, controller 42 is operable to selectively divert exhaust gas away from turbine 26, and thereby control the swallowing efficiency of turbine 26.

Controller includes a separate output FC1 through FC-8 (also collectively designed fuel command outputs FC) to control operation of each fuel injector 13a-13h, respectively. The signal paths for outputs FC are also collectively designated by reference numeral 70 in FIG. 1; however, it should be understood that the timing of fuel injected by each injector 13a-13h can be independently controlled for each piston P1-P8 with controller 42. In addition to the timing of fuel injection, controller 42 can also regulate the amount of fuel injected. Typically, fuel amount varies with the number and duration of injector-activating pulses provided to injectors 13a-13h. Furthermore, controller 42 can direct the withholding of fuel from one or more cylinders 12a-12h (and pistons P1-P8) for a desired period of time.

System 110 also includes aftertreatment equipment 17 of subsystem 200 to provide for aftertreatment of exhaust gases before discharge through a conduit 94. During engine operation, exhaust gas flows from turbine outlet 27 through exhaust conduit 34 in fluid communication therewith. Conduit 34 is also in fluid communication with aftertreatment equipment 17. Controller 42 is coupled to one or more components of aftertreatment equipment 17 via coupling 180 which could be wiring or any other information coupling.

Figure 3:
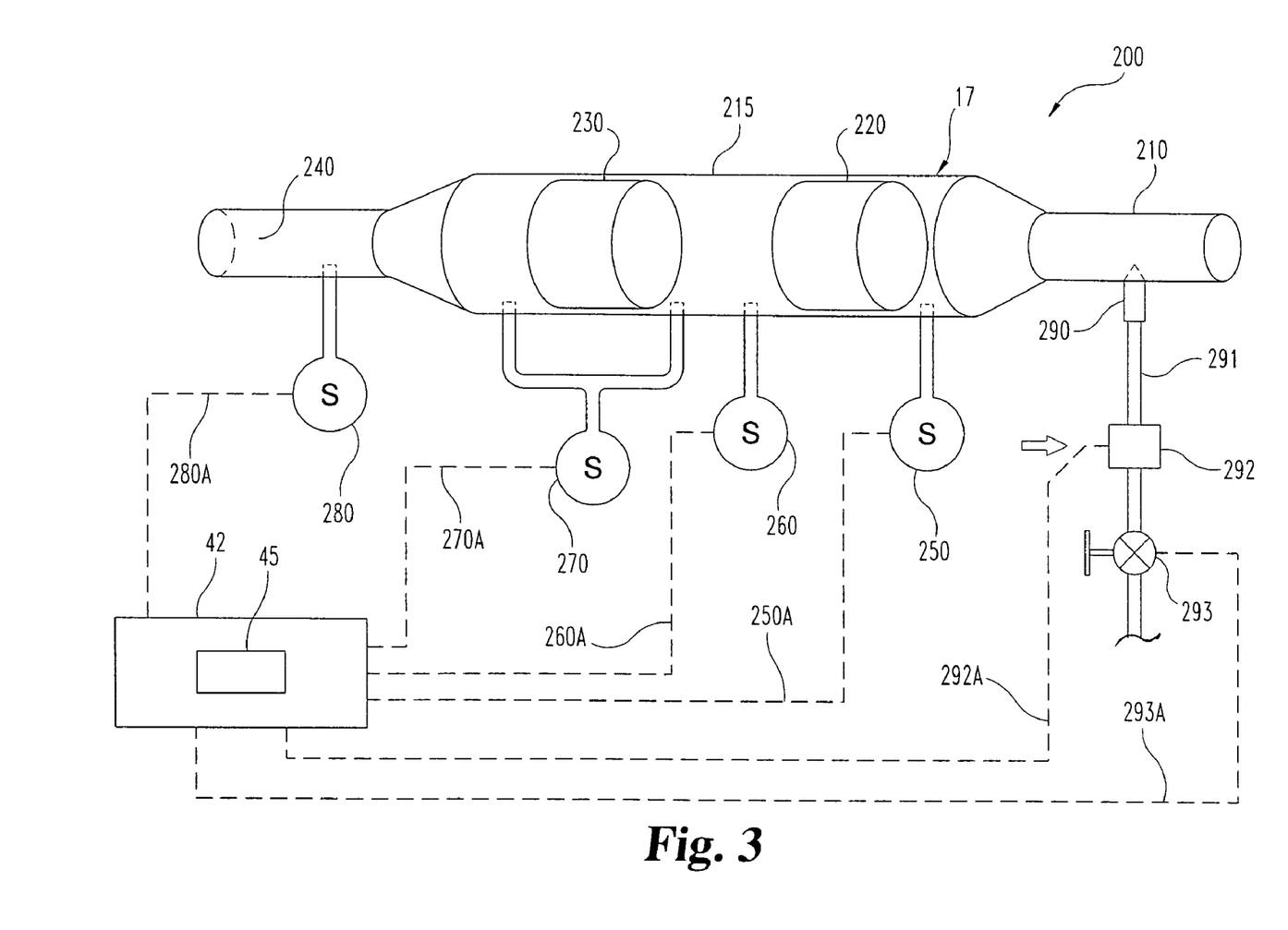
FIG. 3 is a partial diagrammatic view depicting an exhaust aftertreatment subsystem of FIG. 2 in greater detail.

With reference to FIG. 3, aftertreatment equipment 17 is shown in greater detail within subsystem 200; where like reference numerals refer to like features. Subsystem 200 includes conduit sections 210, 215, and 240 which define a flow pathway through which exhaust from a diesel engine can travel. Section 210 is in fluid communication with conduit 34, and may be an integral or separable part thereof. Exhaust arrives at section 210 where it can be dosed with diesel doser 290. Doser 290 receives fuel from line 291 which is coupled to actuator 292. When activated, actuator 292 provides diesel dosing in a standard manner. Emergency shutoff valve 293 is also provided to disable the diesel supply to doser 290 in an emergency. Actuator 292 and/or doser 290 are operatively coupled to and controlled by controller 42.

There are multiple variations to the illustrated diesel doser system which are contemplated. For example, substances other than diesel, for example, alcohols, urea, ammonia, natural gas, other hydrocarbons and/or hydrocarbon fuels could be used for dosing. Additionally, dosing could occur at a different location from that illustrated. For example, a fuel-rich setting could be provided by appropriate activation of fuel injectors that provide fuel to engine cylinders (not shown) in such a manner that engine 110 produces exhaust that includes a controlled amount of uncombusted (or incompletely combusted) fuel (in-cylinder dosing).

From section 210 exhaust travels to section 215 where it encounters diesel oxidation catalyst device (DOC) 220, which catalyzes an oxidation reaction with the dosing substance(s). Temperature sensors 250 and 260 are positioned before and after DOC 220 and are operable to provide signals representative of absolute temperature at the inlet and outlet of DOC 220, respectively. Sensors 250 and 260 provide these temperature information signals to controller 42 via signal couplings 250A and 260A, respectively. Sensors 250 and 260 could be independent or could be parts of a single sensor arrangement. They could pass through section 215 to sense temperature at its interior or could be otherwise be thermally coupled to appropriate locations along section 215. Further, sensors 250 and 260 could be located substantially as shown in FIG. 3 or could be placed further upstream, further downstream, or in a variety of other positions.

From DOC 220 exhaust travels through section 215 to filter 230, which could be, for example, a regenerative plasma soot filter, an SCR filter, or any other type of filter. Pressure sensor 270 senses information corresponding to a pressure difference across filter 230 and provides the same to controller 42 via signal couplings 270A. Sensor 270 could include a number variations such as those described above in connection with sensors 250 and 260, as well as others.

From filter 230 the filtered exhaust travels to section 240 which is in fluid communication with tail pipe 94, and may be an integral or separable part thereof. From tail pipe 99 the treated exhaust is released. Temperature sensor 280 senses information representative of exhaust temperature at section 240 and provides the same to controller 42 via signal coupling 280A.

Figure 4:
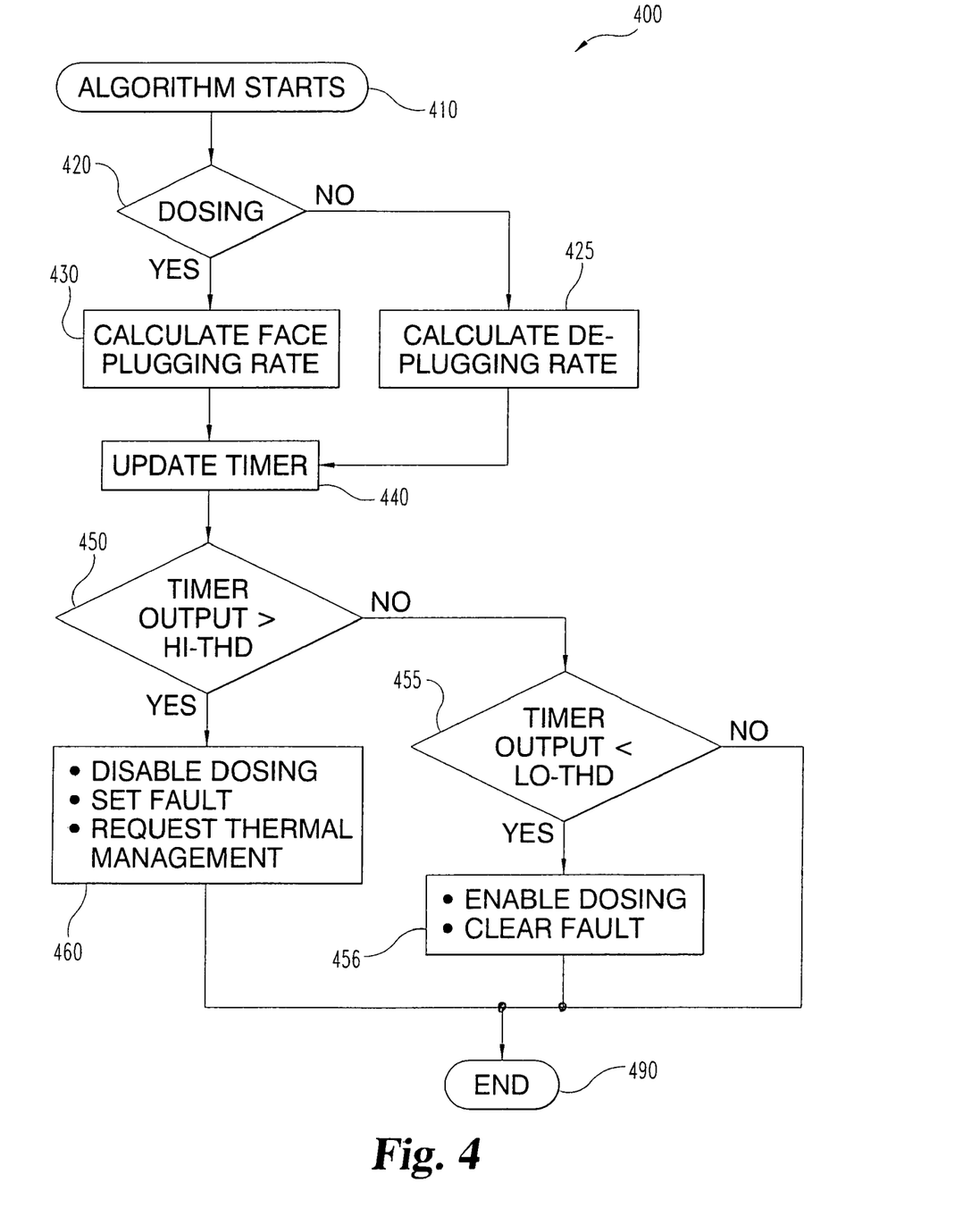
FIG. 4 is a flowchart illustrating one procedure for operating the internal combustion engine system of FIGS. 1-3.

With reference to FIG. 4 there is shown a flowchart that depicts procedure 400 according to the operation of one embodiment of the present invention. Procedure 400 could be embodied in various forms of operating logic executed by controller 42, including software, hardware (including digital circuitry, analog circuitry or both), firmware, and/or other forms of logic. Procedure 400 begins at state 410 where operation is initiated, or reset or re-initiated in some instances. From state 410, procedure 400 continues with conditional 420 where it is tested or determined whether dosing is occurring. If dosing is active, procedure 400 continues with state 430 where a rate of plugging, such as face plugging of a diesel oxidation catalyst device 220, is calculated. If dosing is not occurring, procedure 400 continues with state 425 where a rate of de-plugging, such as face de-plugging of diesel oxidation catalyst device 220 is calculated.

From both state 430 and state 425, procedure 400 continues with state 440 where a timer update operation is performed. From state 440 procedure 400 proceeds to conditional 450 where an output of a timer is tested or compared with an upper (high) threshold. If the output of the timer is greater than (or optionally greater than or equal to) the upper threshold, procedure 400 then continues to state 460 where dosing is disabled, a fault flag or indicator is set, and thermal management is requested. From state 460, the procedure 400 continues with end state 490 where it can idle indefinitely or reset to perform procedure 400 again. If the output of the timer is less than (or optionally less than or equal to) the upper threshold, procedure 400 continues with conditional 455. At conditional 455, an output of a timer is tested or compared with a lower threshold. If the output of the timer is less than (or optionally less than or equal to) the lower threshold, procedure 400 continues to state 456 where dosing is enabled and a fault flag or indicator is cleared. Procedure 400 then continues with end state 490 where it can idle or be reset to perform procedure 400 again. Diagram 400 also proceeds to end state 490 from conditional 455 if the output of the timer is greater than (or optionally greater than or equal to) the lower threshold.

According to one embodiment of the present invention, there is provided a detector of DOC face plugging operable to calculate the rate of DOC face plugging. The detector can account for one or more of multiple contributors of DOC face plugging, including DOC inlet temperature, exhaust mass flow rate, exhaust particulate matter flow rate, and HC concentration, in calculating the rate of plugging. When the detector senses the DOC is moderately plugged, it can start the process of de-plugging by disabling active regeneration and requesting low particulate matter emission, elevated exhaust temperature and high $NO_2$ emission from the engine. Meanwhile, the detector calculates the de-plugging rate and when the face plugging is cleaned active regeneration is allowed again.

According to one embodiment of the present invention, the detector is a virtual detector, which is at least partially physical and partially empirical. Such a detector can be adopted on different diesel engine systems with various configurations with minimum efforts in calibration. The plugging rate calculation can be an empirical regression equation derived from experimental results. The calculated plugging rate is fed into a timer, which registers the time of the plugging process. One example of a regression utilizes a first order regression with DOC inlet temperature, particulate matter mass fraction, exhaust flow, and doser flow as variables as well as an offset constant, and can be generally described by the following mathematical relationship:

$$R = ax_1 + bx_2 + cx_3 + dx_4 + k$$

where $x_1$ is DOC inlet temperature, $x_2$ is particulate matter mass fraction (a measure of exhaust particulate matter content), $x_3$ is exhaust flow, $x_4$ is doser flow (a measure of exhaust hydrocarbon (HC) content for hydrocarbon dosing, such as diesel dosing); a, b, c, and d are coefficients; and k is an offset constant. The timer output is then compared to a calibrated upper threshold. When this pre-determined amount of time has been reached, the virtual sensor is used to determine that the DOC cannot take any more face plugging before a substantial loss in performance or damage could occur. It then forces dosing to stop, and requests thermal management and/or other de-plugging operation from the engine. A no-lamp fault code can be set to notify the system the reason for halted design. In one form, de-plugging thermal management includes low soot, high $NO_X$ and high exhaust temperature from the engine. High $NO_X$ and high exhaust temperature provide for at least partial removal of soot deposition on the DOC face. While the thermal management is operating, the virtual detector calculates the de-plugging rate based on the NOx flow rate, DOC inlet temperature and exhaust mass flow rate. The model can be partly physical and partly empirical. After the timer is reset, the algorithm stops requesting thermal management and resets appropriate flag(s) to permit dosing again.

Calculation of the plugging/de-plugging rates is based on factors contributing to the phenomenon. One possible cause of fuel-induced DOC face plugging could be partially oxidized hydrocarbons conglomerating with soot to form deposits on the face of the DOC. The process is especially substantial under conditions of low exhaust temperature and mass flow. Under such circumstances, DOC inlet temperature, exhaust mass flow, exhaust hydrocarbon concentration, and PM flow are all contributors to DOC face plugging. On the other hand, the de-plugging process is dependent on the oxidation of the soot deposit on the DOC face with $NO_2$ and $O_2$. The rates of the reactions concerned are determined by the species concentration ($NO_2$ & $O_2$) and DOC inlet temperature. High mass flow rate empirically has some effects on physically removing the soot deposit from the DOC face. Accordingly, effects of exhaust mass flow rate are taken into account in calculating the de-plugging rate.

It should be appreciated that a variety of other regressions could be employed for rate calculations. For example, the number of variables used could be more or fewer, for plugging/de-plugging rate calculations, such as a regression that accounted for only DOC inlet temperature and particulate matter mass fraction, or any other combination of variables, coefficients, and/or constants operable to determine a plugging or de-plugging rate. Second order and higher order regressions could also be used as could look-up tables or a combination of mathematical expressions and look-up tables. For example, to determine a plugging or de-plugging rate, a look-up table could be used where information of $NO_2$ mass fraction and of DOC inlet temperature are provided in the table and a relative factor is used in connection with a countdown timer to determine when de-plugging has occurred. This information could also be multiplied with a table including information of exhaust flow to adjust the de-plugging rate determination.

Diesel oxidation catalyst devices for diesel fuel applications may be a flow through device having a canister containing a honeycomb-like structure or substrate. The substrate can have a large surface area that is coated with an active catalyst layer. This layer may contain a small, well dispersed amount of precious metals such as platinum or palladium. However, other DOC structures, compositions, and/or arrangements are also contemplated. As the exhaust gases traverse the catalyst, carbon monoxide, gaseous hydrocarbons and liquid hydrocarbon particles (unburned fuel and oil) are oxidized, reducing harmful emissions. While various subsystems, controllers and the like are illustrated and described in connection with a land traveling vehicle 100, it should be appreciated that they could also be used in connection with a variety of other applications including electrical power generators, marine and naval propulsion systems, pipeline and other pumping systems, and other industrial or commercial systems and apparatus to name a few.

One embodiment according to the present invention is a diesel engine emission control system including a subsystem defining an exhaust flowpath from an exhaust input to an exhaust output, a diesel oxidation catalyst device, and a filter; a sensor arrangement structured to detect temperature associated with the diesel oxidation catalyst device (such as DOC inlet temperature); and circuitry responsive to the sensor arrangement to determine a control signal representative of a rate of plugging or de-plugging of the diesel oxidation catalyst device as a function of one or more of temperature information, particulate matter level, exhaust mass flow, and exhaust hydrocarbon level. According to one variation of this embodiment the circuitry is further operable to request engine management from an engine control module. According to another variation of this embodiment the engine management includes means for setting engine operation for low soot, high $NO_X$, and high exhaust temperature.

In another embodiment, an apparatus comprises a diesel engine with a flow pathway, a diesel oxidation catalyst device disposed substantially in the pathway, and a particle filter disposed substantially in the pathway; a controller and a sensor arrangement operably coupled to the controller effective to provide information to the controller that corresponds to temperature at an input to the catalyst device and temperature at an output of the catalyst device; and software loaded on the controller operable to calculate a rate of plugging and a rate of de-plugging of the catalyst device. In one variation of this embodiment, the software includes a module operable to compare a calculated plugging rate and a threshold. According to a further variation of this embodiment, the module includes means for determining plugging rate based upon a regression. According to still another variation of this embodiment, the software is operable to control engine operation with a means for setting exhaust temperature, means for setting soot concentration, and means for setting $NO_X$ concentration. In yet another variation, the software includes a module operable to compare a calculated plugging rate and a threshold based upon an empirical regression, and the controller is further programmed with software operable to control engine operation.

A further embodiment is directed to a method that comprises operating an exhaust treatment system including a diesel oxidation catalyst device and a soot filter; determining information representative of temperature associated with the diesel oxidation catalyst device; calculating a plugging rate based at least in part upon the temperature; and initiating a de-plugging operation. One variation of this embodiment includes further determining exhaust mass flow, exhaust particulate matter flow, and exhaust hydrocarbon concentration and basing the he calculation on these additional parameters. Also, this embodiment may include setting engine operation for low particulate matter emissions, elevated exhaust temperature, and high $NO_X$ emission to perform the deplugging operation.

Still a further embodiment includes a system comprising means for operating an exhaust treatment system including a diesel oxidation catalyst device and a soot filter; means for determining information corresponding to input temperature and output temperature of a the diesel oxidation catalyst device; means for calculating a plugging rate based at least in part upon the temperatures; and means for initiating a de-plugging operation. One variation of this embodiment includes further means for determining exhaust mass flow rate, exhaust particulate matter flow rate, and exhaust hydrocarbon concentration; and means for calculating is further based at least in part upon the further determining. Alternatively or additionally, this embodiment can include means for setting engine operation for low particulate matter emissions, elevated exhaust temperature, and high $NO_X$ emissions.

While the invention has been illustrated and described in detail in the drawings and foregoing description, the same is to be considered as illustrative and not restrictive in character, it being understood that only selected embodiments have been shown and described and that all changes, modifications, and equivalents that come within the spirit of the disclosed embodiments and/or the following claims are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An engine system comprising:
   a subsystem defining an exhaust flowpath from an exhaust input to an exhaust output, a diesel oxidation catalyst device, and a filter;
   a sensor arrangement structured to detect temperature information for an exhaust flow along the exhaust flowpath through the diesel oxidation catalyst device; and
   circuitry responsive to the sensor arrangement to determine a control signal representative of a plugging or de-plugging of the diesel oxidation catalyst device as a function of the temperature information and time.

2. The system of claim 1 operably coupled with a diesel engine of a vehicle wherein the circuitry comprises a portion of an engine control module of the vehicle, and wherein the filter is a regenerative filter and is downstream of the diesel oxidation catalyst device along the exhaust flowpath.

3. The system of claim 1 wherein the circuitry includes means for determining particulate matter information about the exhaust flow and means for determining the control signal from the particulate matter information as a variable of the function.

4. The system of claim 3 wherein the circuitry includes means for determining the function with variable representative of exhaust mass flow and hydrocarbon amount in the exhaust flow.

5. The system of claim 1 wherein the sensor arrangement includes a first temperature sensor and a second temperature sensor operatively coupled to the circuitry and is further operable to request engine management from an engine control module.

6. The system of claim 5 wherein the engine management includes means for setting engine operation for low soot, high $NO_x$, and high exhaust temperature, and the exhaust temperature is monitored by the second temperature sensor.

7. An engine system comprising:
   a subsystem defining an exhaust flowpath from an exhaust input to an exhaust output, a diesel oxidation catalyst device, and a filter;
   a sensor arrangement structured to detect temperature information for an exhaust flow along the exhaust flowpath through the diesel oxidation catalyst device; and
   circuitry responsive to the sensor arrangement to determine a control signal representative of a plunging or de-plugging of the diesel oxidation catalyst device as a function of the temperature information and time;
   wherein the sensor arrangement includes a first temperature sensor and a second temperature sensor operatively coupled to the circuitry and is further operable to request engine management from an engine control module;
   wherein the engine management includes means for setting engine operation for low soot, high $NO_x$, and high exhaust temperature, and the exhaust temperature is monitored by the second temperature sensor; and
   wherein the circuitry is operable to calculate a rate of plugging or de-plugging substantially during the engine management.

8. An engine system comprising:
   a subsystem defining an exhaust flowpath from an exhaust input to an exhaust output, a diesel oxidation catalyst device, and a filter;
   a sensor arrangement structured to detect temperature information for an exhaust flow along the exhaust flowpath through the diesel oxidation catalyst device; and
   circuitry responsive to the sensor arrangement to determine a control signal representative of a plugging or de-plugging of the diesel oxidation catalyst device as a function of the temperature information and time; and
   wherein the filter is a catalyzed soot filter, the thermal management comprises setting engine operation for low soot, high $NO_x$, and high exhaust temperature, and the circuitry is operable to calculate a rate of plugging or de-plugging substantially during the thermal management.

9. An apparatus comprising:
   a diesel engine including a flow pathway, a diesel oxidation catalyst device disposed substantially in the pathway, and a particle filter disposed substantially in the pathway;
   a controller and a sensor arrangement operably coupled to the controller effective to provide information representative of temperature of the catalyst device and one or more of exhaust particulate matter content, exhaust mass flow, and exhaust hydrocarbon content; and
   operating logic executed by the controller to calculate one or more of a rate of plugging and a rate of de-plugging of the catalyst device based on the information.

10. The apparatus of claim 9 wherein the controller and sensor arrangement includes means for determining values representative of exhaust particulate matter content, exhaust mass flow, and exhaust hydrocarbon content for inclusion in the information.

11. The apparatus of claim 9 wherein the software includes a module operable to compare a calculated plugging rate and a high threshold.

12. The apparatus of claim 9 wherein the module includes means for determining plugging rate based upon a regression with at least two variables, a first one of the variables corresponding to the temperature at the input, and a second one of the variables corresponding to the exhaust particulate matter content.

13. The apparatus of claim 9 wherein the software includes a module operable to compare a calculated plugging rate and a high threshold based upon an empirical regression, and the controller is further programmed with software operable to control engine operation.

14. A method comprising:
   operating an exhaust treatment system including a diesel oxidation catalyst device and a soot filter;
   determining information corresponding to temperature of a the diesel oxidation catalyst device;
   calculating a plugging rate based at least in part upon the input temperature and other information corresponding to one or more of exhaust particulate matter content, exhaust mass flow, and exhaust hydrocarbon content; and
   initiating a de-plugging operation.

15. The method of claim 14 including further determining exhaust particulate matter content, exhaust mass flow, and exhaust hydrocarbon content for the other information.

16. The method of claim 14 further including setting engine operation for low particulate matter emissions, elevated exhaust temperature, and high $NO_x$ emissions; and wherein the determining includes receiving a single value representing a relative differential between the input temperature and the output temperature.

17. The method of claim 14 implemented at least in part in an engine control module operatively coupled to a diesel engine of a vehicle; and wherein the initiating a catalyst device de-plugging operation includes reversing regeneration.

18. The method of claim l4, wherein the other information includes at least the exhaust particulate matter content.

19. The method of claim 14 further including calculating a de-plugging rate and enabling dosing based upon the de-plugging rate.

20. The method of claim 19 wherein the enabling is based upon a comparison of the calculated de-plugging rate and a threshold, and the initiating is based upon a comparison of the calculated plugging rate and a threshold.

* * * * *

UNITED STATES PATENT AND TRADEMARK OFFICE
CERTIFICATE OF CORRECTION

PATENT NO. : 7,685,814 B2
APPLICATION NO. : 11/485238
DATED : March 30, 2010
INVENTOR(S) : Yuetao Zhang, Daniel D. Wilhelm and Brian P. Liimatta It is certified that error appears in the above-identified patent and that said Letters Patent is hereby corrected as shown below:

Col. 10, Line 16: Replace "plunging" with --plugging--.

Signed and Sealed this

Fifteenth Day of June, 2010

David J. Kappos
*Director of the United States Patent and Trademark Office*